March 2, 1926. 1,575,055

N. JAPOLSKY ET AL

DEVICE FOR THE DISTANT CONTROL OF A MOVABLE MEMBER

Filed June 9, 1924 2 Sheets-Sheet 1

Inventors
N. Japolsky
M. Kostenko
B. Woronoff
C. Sabaneew
By Marks & Clerk attys.

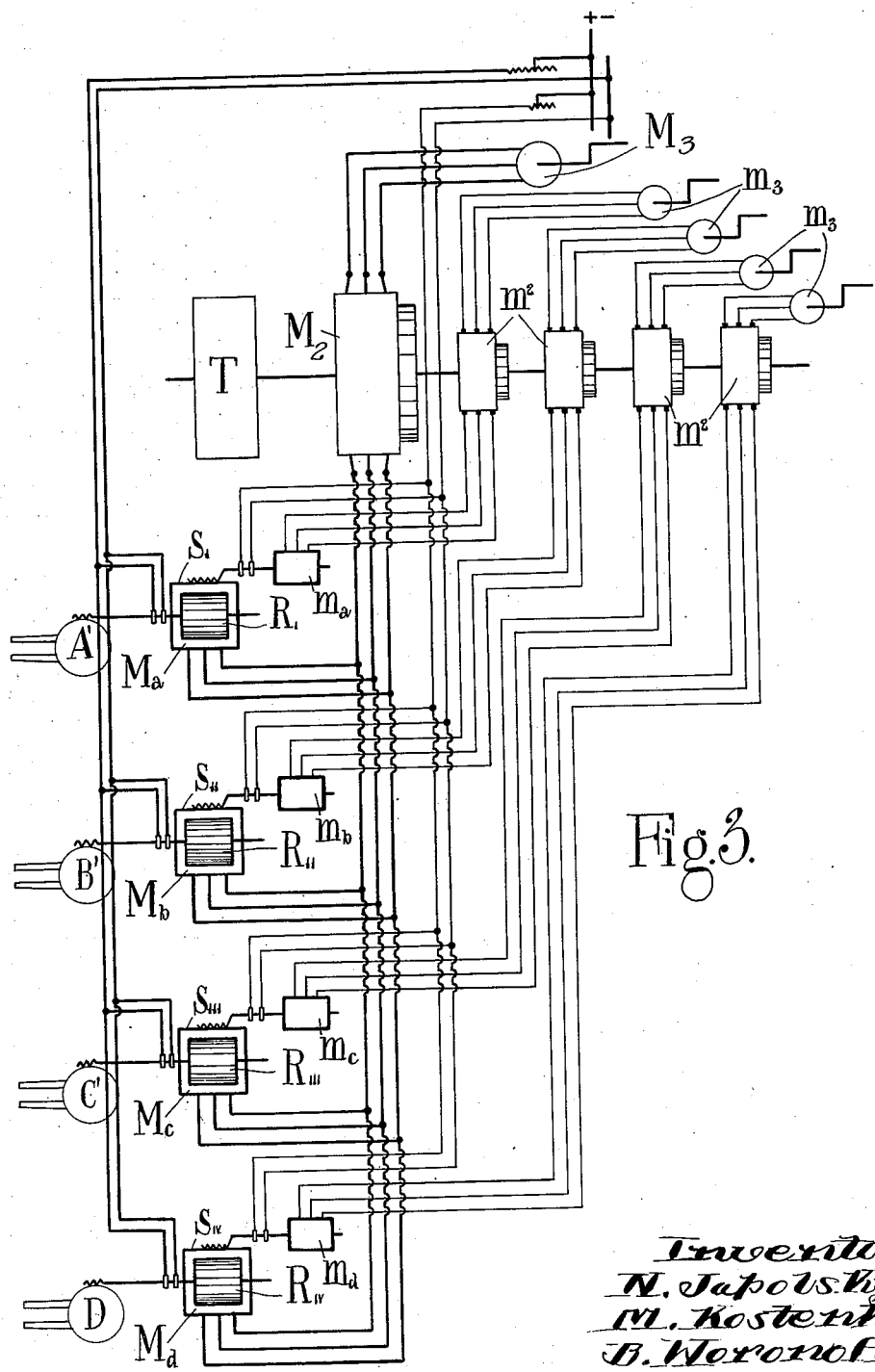

Patented Mar. 2, 1926.

1,575,055

UNITED STATES PATENT OFFICE.

NICOLAS JAPOLSKY AND MICHAEL KOSTENKO, OF LONDON, ENGLAND, AND BORIS WORONOFF AND CONSTANTIN SABANEEW, OF PETROGRAD, RUSSIA.

DEVICE FOR THE DISTANT CONTROL OF A MOVABLE MEMBER.

Application filed June 9, 1924. Serial No. 718,901.

*To all whom it may concern:*

Be it known that we, NICOLAS JAPOLSKY and MICHAEL KOSTENKO, both citizens of the Republic of Russia, and residing at Arcos House, 68ᵃ Lincoln's Inn Fields, London W. C. 2, England, and BORIS WORONOFF, a citizen of the Republic of Russia, and residing at Mejdounarodny Prospekt 35, Petrograd, Russia, and CONSTANTIN SABANEEW, a citizen of the Republic of Russia, and residing at Sovietsky Prospekt 38, Petrograd, Russia, have invented a certain new and useful Device for the Distant Control of a Movable Member, of which the following is a specification.

The subject of this invention is a device for the distant control of a movable member by means of an electric transmitter having a rotating part, which transmitter, when the rotatable part is stationary, supplies continuous current and when the said part rotates supplies an alternating current, the direction and frequency of which are dependent on the direction of rotation and speed of the said part. This device is characterized by the feature that the said current acts as the excitation current of an alternating current commutator generator, the terminals of which are connected to the stator of a synchronous motor driving the movable member, the frequency and terminal voltage of the generator being regulatable by varying the frequency and voltage of the current of excitation of the same.

Owing to this arrangement, when the transmitter is stationary the rotor of the synchronous motor will remain in a stable position of rest and at each revolution of the transmitter the said rotor and with it the member will turn through a certain angle. The power required for moving the member is supplied by the motor of the alternating current commutator generator and not by the transmitter.

In the accompanying drawing two constructional examples of the invention are shown together with various details.

In the drawing;

Figure 3 is a diagrammatic view of the apparatus intended for the simultaneous movement of several turrets of a war-ship from one point of control.

Figure 1:
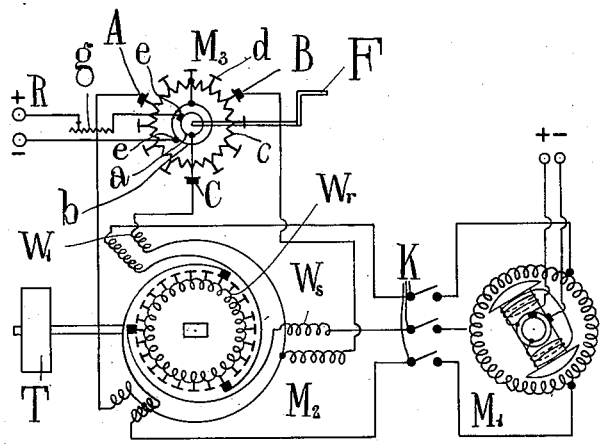
Figure 1 is a diagrammatic view of one form of the apparatus.

Referring to Figure 1, $M_1$ is a three-phase synchronous motor which is coupled mechanically with the member to be controlled. $M_2$ is an alternating current commutator generator of the type described, for instance, in British Patent No. 210,482 of October 3rd, 1922. $M_3$ is a transmitter, the movements of which control those of the motor $M_1$ as hereinafter explained.

The transmitter $M_3$ has a winding $c$, which is closed on itself and the coils of which are connected to the sections $d$ of a commutator. A continuous current from supply mains R is sent into this winding through the slip rings $a$, $b$ and the brushes $e$. The winding connected to the commutator and the rings are adapted to be manually rotated by the crank F relatively to stationary brushes A, B, C, bearing on the commutator. Each of the brushes A, B, C, is connected to one of the exciter coils $W_1$ of the alternating current commutator generator $M_2$. This exciter winding $W_1$ is mounted on the stator of the said generator, the working winding of which comprises the winding $W_s$ on the stator and the winding $W_r$ on the rotor. The windings $W_s$ and $W_r$ each have the same total number of turns, and they are connected with each other by means of brushes bearing on the commutator of the alternating current commutator generator, these brushes being arranged in such a way that the magnetic effects of the windings $W_s$ and $W_r$ neutralize one another. Thus the working winding as a whole, consisting of the two windings $W_s$ and $W_r$, does not react upon the exciter winding $W_1$, as would ordinarily be the case with two different windings of a transformer.

The terminals of the generator $M_2$ are constituted by those ends of the stator windings $W_s$ which are not connected by the brushes to the commutator, and these terminals are connected to the stator winding of the synchronous motor $M_1$, the rotor winding of which is fed with continuous current.

The current flowing in the exciter winding $W_1$ and supplied by the transmitter $M_3$ is purely magnetizing current. This magnetizing current is not affected at all by variations in the working current which is sent by the generator $M_2$ to the synchronous motor $M_1$ and which depends upon the load upon said synchronous motor.

Thus the power required for turning the synchronous motor $M_1$ is taken from a motor T which is coupled to the rotor of the generator $M_2$ and not from the transmitter $M_3$, which can therefore be kept very small and which can easily be controlled by means of the crank F.

As the exciter winding is mounted on the stator which carries the generator terminals, it will be easily understood that the periodicity of the working current supplied by the generator is equal to the periodicity of the exciting current supplied by the transmitter, whatever be the speed of the generator.

The generator $M_2$ is driven by the motor T, and its speed can therefore be kept constant, whatever be the variations in the periodicity of the current supplied by the generator, which periodicity depends solely upon the periodicity of the exciting current and therefore depends solely upon the speed of rotation of the transmitter $M_1$.

The voltage generated in the working winding and appearing at the terminals of the generator depends, as in other direct current and alternating current generators, upon the magnetic flux and the speed of rotation. Thus, since the speed is constant, the voltage depends solely upon the magnetic flux, that is, it depends upon the strength of the exciting current and is unaffected by its periodicity. Thus the generator develops a considerable voltage even when the periodicity is zero or is very low. When the movable part of the transmitter is stationary, the continuous current is taken from the supply mains R and is sent through the winding $c$ and through the brushes A, B, C into the exciter winding $W_1$ of the generator $M_2$. The latter will supply the stator of the synchronous motor $M_1$ with continuous current and the rotor of this motor will take up a definite position corresponding substantially to the ratio of the currents supplied through the different terminals of the generator. On the rotatable part of the transmitter $M_3$ being moved by means of the crank F, an alternating current will be sent into the exciter winding of the generator $M_2$, the direction of the rotation of the excitation field depending on the direction of rotation of the rotating part $M_3$. Thus the generator $M_2$ will send a current into the stator winding of the synchronous motor $M_1$, and the direction of rotation of the field of this stator winding will be dependent on the direction of rotation of the rotating part of the transmitter $M_3$ and the frequency of which will depend on the speed of rotation of the said part. The rotor of the synchronous motor will also rotate at a speed depending on the frequency of the current feeding its stator, the direction of rotation of the said rotor depending on the direction of rotation of the stator field. As the full voltage is applied to the motor $M_1$ irrespective of the periodicity, therefore the motor will develop its full torque whether it is rotating or whether it is at a standstill. Thus, when the rotating parts of the transmitter $M_3$ are stationary, the rotor of the synchronous motor $M_1$ will remain stationary in stable equilibrium, and when these rotatable parts are turned through a certain angle the rotor of the synchronous motor will also turn through a corresponding angle and in a direction depending on the direction of rotation of the said rotatable parts.

The voltage of the exciter current of the generator $M_2$ can be varied by means of the regulating resistance $g$. K indicates a switch between the generator $M_2$ and the synchronous motor $M_1$.

Figure 2:
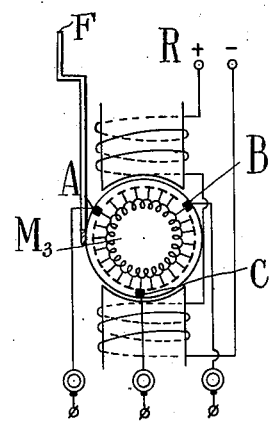
Figure 2 is a similar view of a detail of a modification.

According to Figure 2, the transmitter $M_3$ comprises a dynamo provided with the usual commutator. The exciter coils of this dynamo are fed from the supply mains R with continuous current. The three brushes A, B, C, which are connected to the exciter winding of the generator $M_2$, are mounted upon a ring and can all be displaced as one unit with reference to the commutator by means of the crank F. When the rotor of the dynamo $M_3$ is caused to rotate, the brushes A, B, C will feed the generator $M_2$ with continuous current as long as these brushes are stationary with respect to the commutator, while, when the said brushes are turned relatively to the commutator, they will feed the generator with an alternating current, the direction and periodicity of which will depend on the speed and the direction of the movement of the said brushes A, B, C.

The constructional form shown in Figure 3 is intended for the simultaneous movement of the turrets A', B', C', D of a warship from one point of control. For this purpose a transmitter $M_3$ of the kind described is provided at the place of central control. The turrets are turned by means of synchronous motors $M_a$, $M_b$, $M_c$, $M_d$. For this purpose a worm is keyed on the rotor shaft of each of the said motors, which worm meshes with a worm wheel fixed to the turret. Between the transmitter $M_3$ and the synchronous motor is the generator $M_2$ which is driven by the motor T. The four rotors $R_I$, $R_{II}$, $R_{III}$, $R_{IV}$ of the synchronous motors are connected in parallel to the continuous current supply. When the crank of the movable part of the transmitter $M_3$ is turned, the four turrets A', B', C', D will each be turned through an angle $\alpha$, which is proportional to the angle through which the movable parts of the transmitter $M_3$ are turned.

Thus, all the turrets can be directed to a movable object from this single point of control. The four turrets, which are located next to one another, are not at exactly the same distance from the objective. When they have been directed from the central point of control to the said objective it is necessary to turn each turret separately through a small angle $\Delta\alpha$. For this purpose the four small synchronous motors $m_a$, $m_b$, $m_c$, $m_d$ are provided, which, by means of worm gearing turn the stators $S_I$, $S_{II}$, $S_{III}$ and $S_{IV}$ of the synchronous motors $M_a$, $M_b$, $M_c$, $M_d$. Each of these small synchronous motors is provided with a transmitter $M_3$ and an alternating current commutator generator $M_2$. After all the turrets have been turned through an angle $\alpha$ by means of the transmitter $M_3$, each turret must be brought separately into exactly the determined position by means of its transmitter $M_3$, which operates in the same manner as the transmitter $M_3$ at the central point of control.

Figure 4:
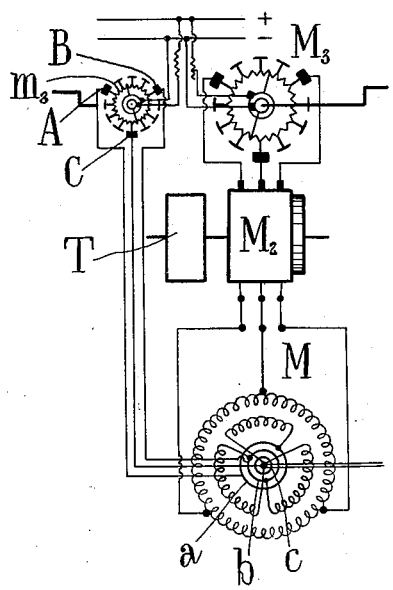
Figure 4 is a diagrammatic view of a modified form of the apparatus.

In order to effect the correction $\Delta\alpha$ the synchronous motors $M_a$, $M_b$, $M_c$, $M_d$ might be arranged as shown in Figure 4. In this Figure $M_3$ is a transmitter similar to that shown in Figure 1 and $M_2$ is the alternating current commutator generator. The rotor of the synchronous motor M, which is mechanically connected with the gun to be driven, has three windings in star, which are connected by means of rings $a$, $b$, $c$, and the corresponding brushes to the brushes A, B, C of a transmitter $M_3$, which is similar to the transmitter $M_3$. On the crank of the transmitter $M_3$ being turned, a three-phase current is sent into the rotor of the motor M and the field of excitation of the said motor will be capable of rotating with respect to the rotor and the rotor will rotate more rapidly or more slowly with respect to the synchronous speed of the motor, thus providing for the complementary displacement $\Delta\alpha$.

Having now described our invention what we claim as new and desire to secure by Letters Patent is:

1. An installation for the distant control of a movable body, comprising a polyphase synchronous motor, driving means between said motor and the movable body, an alternating current commutator generator adapted to supply the full driving current to said motor, means for driving said generator at constant speed, a polyphase excitation winding on said generator, compensating means on the stator of said commutator generator connected with the rotor windings for compensating the effect of the rotor power current, an electric transmitter adapted to supply the currents to said polyphase excitation winding, a movable element forming part of said electric transmitter and adapted to be displaced by hand, and means within the electric transmitter whereby the position of the movable element of the transmitter controls the phase relations of the currents supplied to the excitation winding of the generator.

2. An installation for the distant control of a movable body as claimed in claim 1, comprising a polyphase winding on the rotor of said synchronous motor, a second transmitter adapted to supply currents to said polyphase rotor winding, and means for varying the phase relations of the currents supplied by said second transmitter, for the purpose of enabling the movable body to be turned through a small angle of correction.

3. An installation for the distant control of a movable body as claimed in claim 1, comprising means by which a deflection is imparted to the magnetic fields of the synchronous motor, and a second transmitter controlling said deflection means, for the purpose of permitting the movable body to be turned through a small angle of correction.

In testimony whereof we have signed our names to this specification.

NICOLAS JAPOLSKY.
MICHAEL KOSTENKO.
BORIS WORONOFF.
CONSTANTIN SABANEEW.